United States Patent

Watanabe et al.

[11] Patent Number: 6,014,687
[45] Date of Patent: *Jan. 11, 2000

[54] SYSTEM FOR AUDIO COMMUNICATION BETWEEN TWO TERMINALS CONNECTED TO THE INTERNET NETWORK

[75] Inventors: Hidekazu Watanabe, Chiba; Masahiro Asai, Kanagawa; Akimasa Oyama; Kazunori Ozawa, both of Tokyo, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/760,954

[22] Filed: Dec. 6, 1996

[30] Foreign Application Priority Data

Dec. 18, 1995 [JP] Japan .................................. P07-348398

[51] Int. Cl.[7] .............................. H04M 3/00; H04M 7/00; H04Q 11/04
[52] U.S. Cl. .......................... 709/204; 709/201; 709/203; 709/205; 709/238; 370/351; 370/401; 379/201; 379/220
[58] Field of Search .......................... 395/200.31–200.36, 395/200.47–200.49; 370/351–352, 400–403; 379/93, 201, 207, 211, 213, 215, 220, 10, 14–15, 27–34; 709/200–206, 217–219, 238–242

[56] References Cited

U.S. PATENT DOCUMENTS

| 5,483,586 | 1/1996 | Sussman .................................. 379/201 |
| 5,515,427 | 5/1996 | Carlsen et al. .......................... 379/220 |
| 5,610,910 | 3/1997 | Focsaneanu et al. .................... 370/351 |
| 5,687,212 | 11/1997 | Kinser, Jr. et al. ....................... 379/10 |
| 5,737,333 | 4/1998 | Civanlar et al. ......................... 370/352 |
| 5,764,639 | 6/1998 | Staples et al. .......................... 370/401 |

*Primary Examiner*—Zarni Maung
*Assistant Examiner*—Bharat Barot
*Attorney, Agent, or Firm*—Jay H. Maioli

[57] ABSTRACT

A telephone system using terminals in computer network connected via servers to transmit data containing at least audio data through the computer networks. A server is provided with a data base storing call-out information used to connect to a destination terminal. When a source terminal makes a call to a destination terminal, the server of the computer network searches out the connection address of the destination terminal from the data base. Then, the server calls up the destination terminal and establishes connection between the server of the computer network and the destination terminal.

5 Claims, 8 Drawing Sheets

SYSTEM FOR AUDIO COMMUNICATION BETWEEN TWO TERMINALS CONNECTED TO THE INTERNET NETWORK

BACKGROUND OF THE INVENTION

1. Field of the Invention

This invention relates to a telephone system suitable for use as an internet telephone for exchanging audio data through the internet, a worldwide computer network system.

2. Related Art

The internet is a worldwide computer network system connecting computer networks in corporations or universities beyond countries. Increasingly provided are various services using the internet, such as e-mail service, file transfer service, and information search service.

Figure 1:
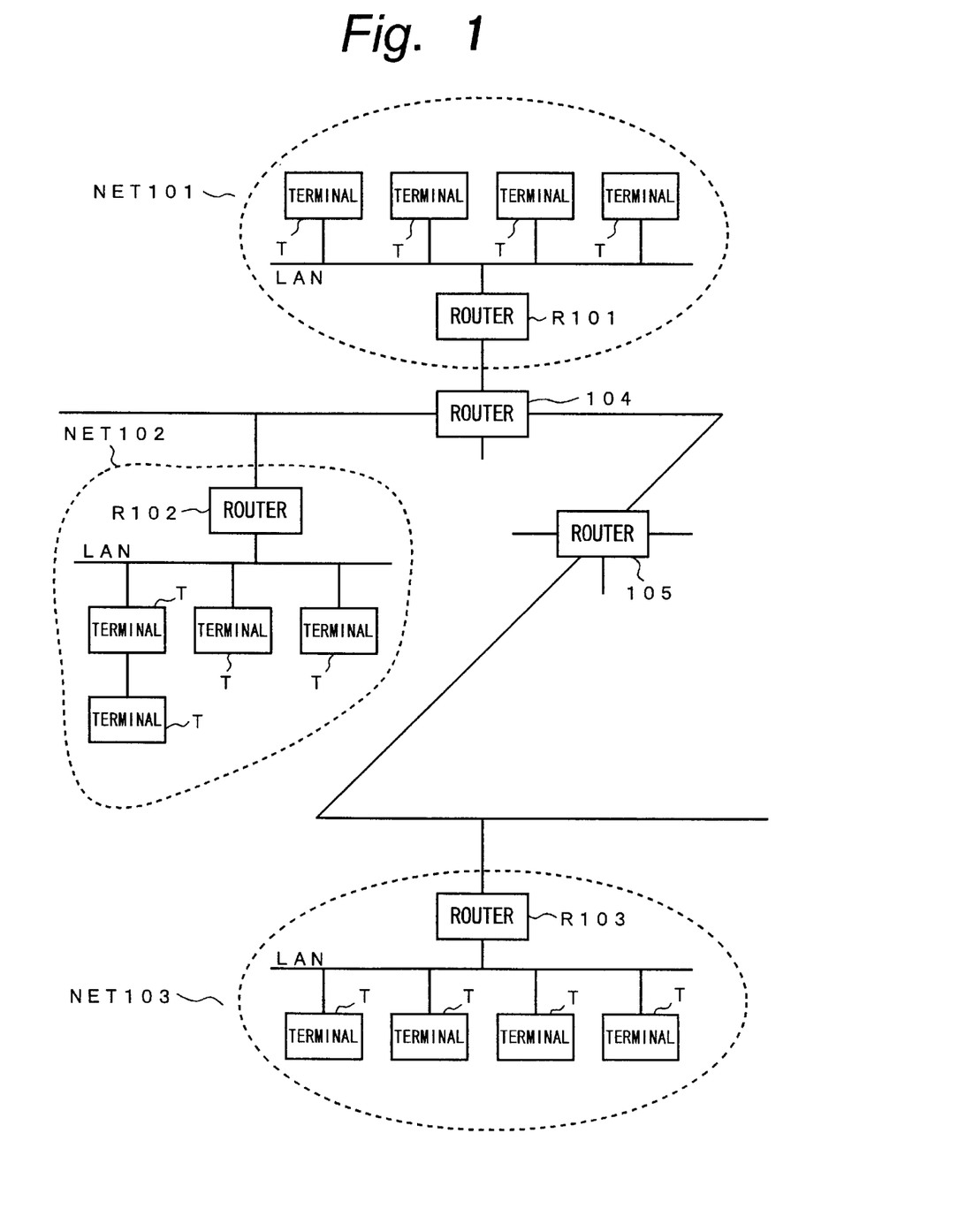
FIG. 1 is a block diagram for use in explaining the internet.

FIG. 1 schematically shows a general aspect of the internet. In FIG. 1, each of computer networks NET101, NET102, NET103, . . . has a plurality of terminals T which are connected together by LAN (Local Area Network) in form of Ethernet or a token ring.

These computer networks NET101, NET102, NET103, . . . are connected together through routers R101, R102, R103, . . . that route data from one computer network to another, depending on the destination of the data.

Computer networks NET101, NET102, NET103, . . . connected through the routers R101, R102, R103, . . . form a computer network system. The computer network system is called internet. The internet enables exchanges of data among computer networks NET101, NET102, NET103, . . .

The internet uses IP (Internet Protocol) as the protocol of its network layer. IP assigns an IP address to each terminal to identify a destination terminal of data. Each IP address is made up of four numerals each of which can be expressed by decimal 8 bits, such as 43.3.25.246.

As the internet expands, the number of IP addresses will possibly become insufficient. In some networks in which a large number of terminals are registered but only a small number of terminals are connected simultaneously, for example, it is possible to use a server on the network to allot currently available IP addresses to actually connected terminals alone in order to minimize the number of IP addresses used. In this manner, the network need not prepare IP addresses in the number corresponding to its terminals, but can effectively use a limited number of IP addresses.

The internet uses TCP (Transmission Control Protocol) and UDP (User Datagram Protocol) as protocols of its transport layer. TCP permits communication after establishing a connection-type transmission connection, and deals with packet sequence control, re-transmission, flow control and congestion control. UDP is a connectionless-type protocol that is used in lieu of TCP in networks requiring real-time transmission. In digital audio transmission, for example, re-transmission is not requested even when a part of packets drops, but audio data is sent successively. In such audio transmission, UDP is used.

Thus, the internet basically uses TCP/IP protocol. That is, IP addresses are assigned to terminals of a computer network to identify individual terminals, and packets are transferred by TCP or UDP.

However, personal computers are not always connected by LAN, and there are some without IP addresses. Therefore, some individuals participating in the internet use internet service providers. Through internet service providers, personal computers can be connected to computer networks and can participate in the internet by, for example, PPP (Point to Point Protocol) or SLIP (Serial Line IP) through telephone lines.

Figure 2:
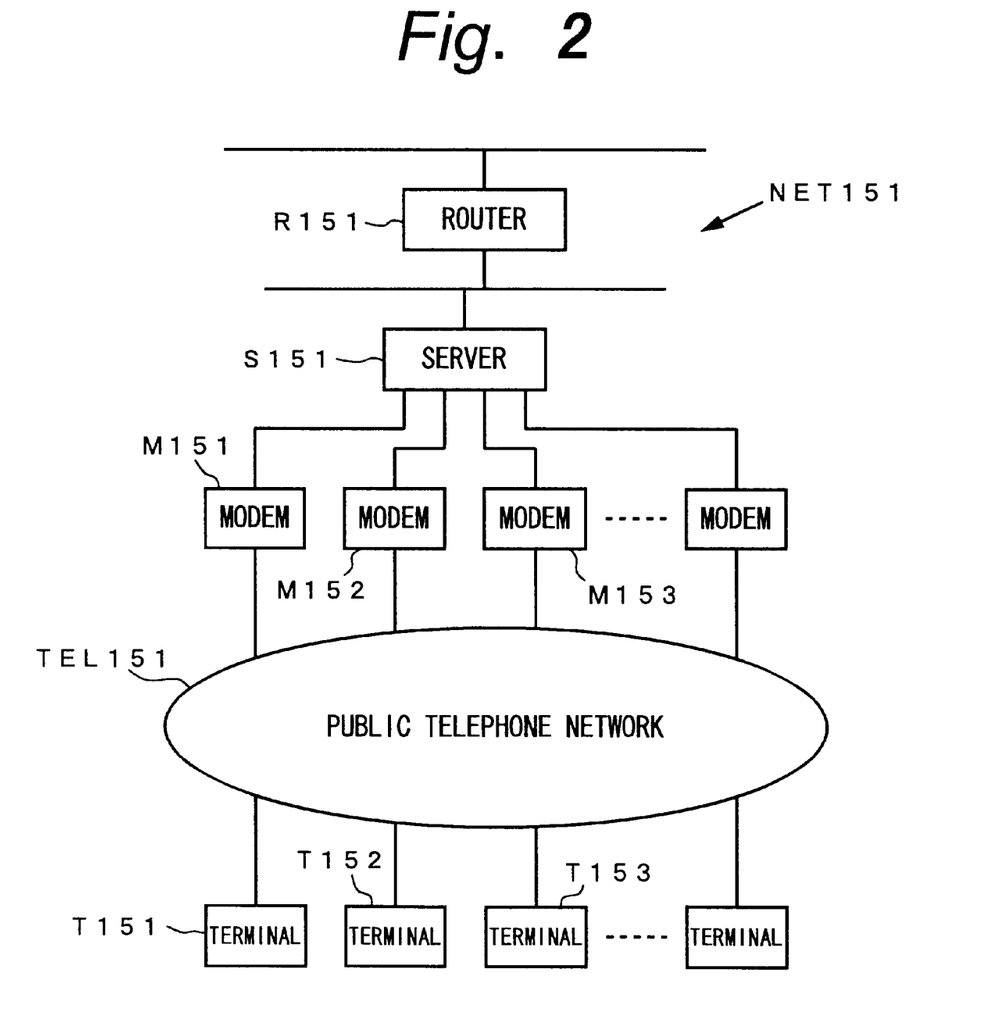
FIG. 2 is a block diagram for use in explaining a PPP connection.

FIG. 2 shows a construction of an internet service provider. The computer network NET151 of the internet service provider includes a server S151 and a router R151. The server S151 is connected to a public telephone line network TEL151 via modems M151, M152, M153, . . .

Terminals T151, T152, T153, . . . are those of individuals personally participating in the internet. Terminals T151, T152, T153, . . . are connected to the public telephone line network TEL151 through modems (not shown). Individual terminals T151, T152, T153, . . . may be personal computers having serial ports.

For participation in the internet through an internet service provider, users previously make a contract with an internet service provider in most cases. When a contract is concluded between a user and an internet service provider, an account code and a password are sent to the user.

When an individual participates in the internet from one of the terminals T151, T152, T153, . . . ,the user dials into the internet service provider to call up the server S151 of the computer network NET151 of the provider. The server S151 responsively requests entry of the account code and the password to confirm whether the user is a contractor. When the server S151 confirms that the entered account code and password are those of a contractor, it searches for an available IP address. If there is any IP address available, it temporarily assigns it to the terminal T151, T152, T153, or any other. Thus, the terminal obtaining the temporary IP address can connect to the internet.

In the above example, terminals are connected by PPP using telephone lines. However, ISDN (Integrated Service Digital Network) may be used alternatively. ISDN 64 includes three channels, namely, two B channels of 64 kbps and one D channel of 16 kbps. When ISDN is used, it can be used as a line of 64 kbps by sending IP packets on the B channels.

Internet telephones for effecting telephone communication using the internet are now being developed. Since the internet is basically free of charge, what is to be paid by the user for internet telephone communication through the internet is the charge based on the contract with the internet service provider and the charge for the call between the user and the internet service provider or the charge for the use of ISDN. Thus, users can enjoy long-distance telephone calls and international telephone calls very economically.

However, the most serious problem with internet telephones is that terminals of users personally participating in the internet cannot be called up.

As already explained, the internet uses IP addresses for designating destination terminals. Thus, terminals of users participating in the internet by PPP under contracts with the internet service provider are assigned with provisional IP addresses only when they request actual connection, but they are not always connected. Therefore, when a terminal to be PPP-connected through an internet service provider is currently out of PPP connection, the terminal cannot be accessed for communication from other terminals.

In contrast, terminals of most LANs established in corporations or universities are assigned with their own IP addresses and always stand for actual communication. Some LANs, however, use a server for assigning IP addresses on the network so as to temporarily assign with an actually connected terminal with an available IP address (DHCP (Dynamic Host Configuration Protocol)) for the purpose of minimizing IP addresses. In such cases, also LAN terminals of corporations or universities cannot be identified definitely, and cannot be accessed.

OBJECTS AND SUMMARY OF THE INVENTION

It is therefore an object of the invention to provide a telephone system that enables communication with a PPP-connected destination terminal by accessing it from an internet telephone for communication using the internet that is, a computer network.

According to the invention, there is provided a computer network telephone system comprising a computer network containing at least one server that can be connected to a plurality of terminal devices through a telephone line to transmit data containing at least audio data, and a data base connected to the server to accumulate call-out information on the individual terminal devices. When a first terminal device connected to the server requests connection to a second terminal disconnected from the server, the server searches out call-out information of the second terminal stored in the data base, then calls out the second terminal, using the obtained call-out information of the second terminal, and enables communication between the first and second terminals.

The server is connected to the data base that stores information on individual terminals to be connected to each terminal, and finds out a destination terminal from the data base. When a source terminal effects a call to a destination terminal, the server of the computer network searches out the destination terminal from the data base, then calls up the destination terminal, and establishes connection between the server of the computer network and the destination terminal. As a result, the destination terminal connected by PPP, etc. can be called up and set for communication.

DESCRIPTION OF THE PREFERRED EMBODIMENTS

The present invention is applied to an internet telephone for transmitting audio data through the internet, and is especially suitable for use of internet telephones connected by PPP through public telephone networks.

Figure 3:
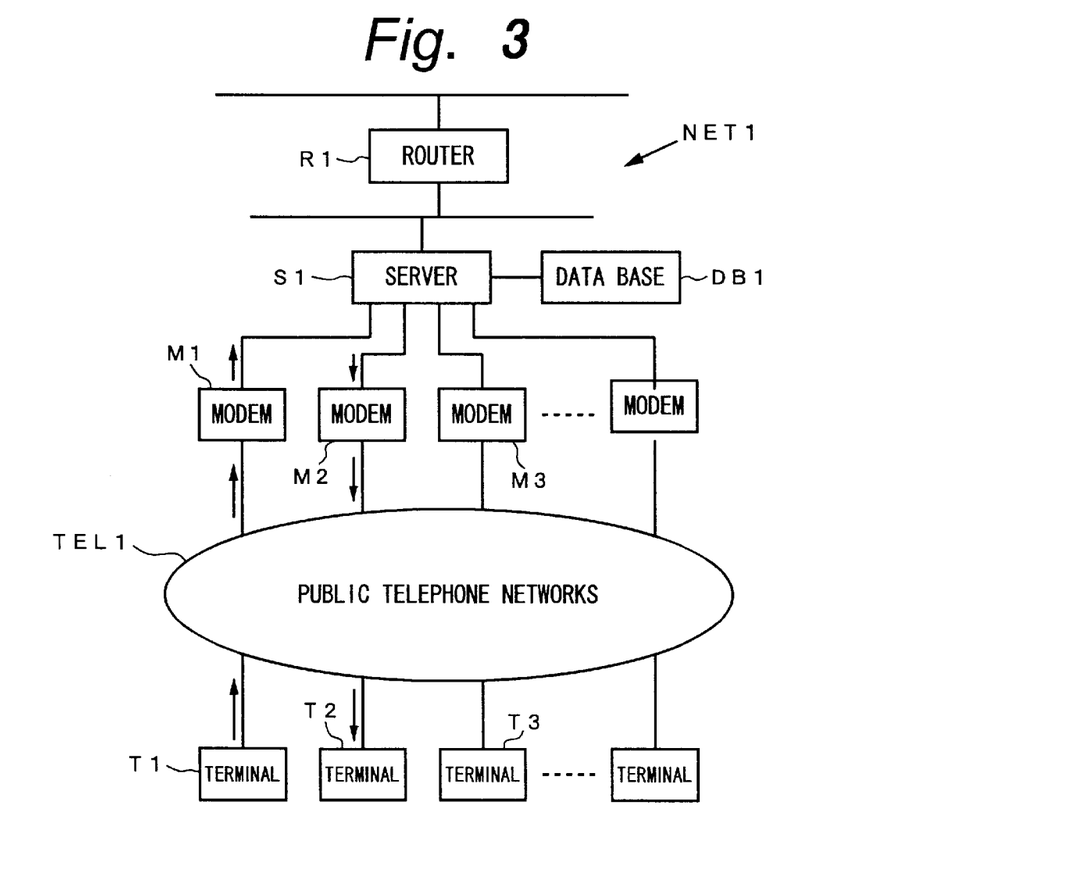
FIG. 3 is a block diagram for use in explaining an internet telephone system to which the invention is applied.

FIG. 3 shows an internet telephone system to which the invention is applicable. In FIG. 3, a computer network NET1 is, for example, a computer network prepared by an internet service provider. The computer network NET1 contains a server S1 and a router R1.

The server S1 is connected to a public telephone network TEL1 through modems M1, M2, M3, . . . Currently, data can be transmitted at the rate of 28.8 kbps through the public telephone network TEL1 by using a high-speed modem.

The computer network NET1 is connected to other computer networks forming the internet through the router R1. The router R1 routes data on the computer network to another computer network containing a destination terminal.

Terminals T1, T2, T3 . . . are those of individuals personally participating in the internet. Individual terminals T1, T2, T3, . . . may be personal computers installed with an internet telephone program or exclusive internet telephone apparatuses. Exclusive internet telephone apparatuses are terminals exclusive to internet telephones facilitating telephone communication using the internet as explained later.

Figure 4:
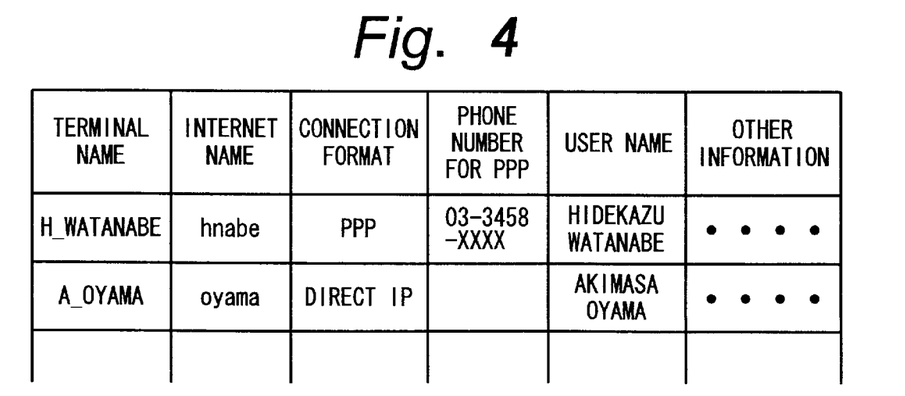
FIG. 4 is a schematic diagram for use in explaining an internet telephone system to which the invention is applied.

The server S1 has a data base DB1. As shown in FIG. 4, the data base DB1 stores "terminal names", "internet names", "connection types", "public phone numbers for PPP", "users' names", and others. The data base DB1 may be established using information obtained from contents of contracts concluded between the internet service provider and users. When the connection type is PPP, the data base DB1 contains telephone numbers for PPP of users contracting with the internet service provider by PPP connection.

Although the terminals T1, T2, T3, . . . are connected to the server S1 by PPP through the public telephone network in the above example, they may be connected through a digital network such as ISDN.

Next explained is a telephone call control in a telephone system to which the invention is applied. Assume here that a telephone call from the terminal T1 to the terminal T2 is desired in FIG. 3. The internet requires an IP address to specify a destination terminal. In this case, it is possible that the destination terminal T2 to be connected by PPP is not currently connected to the computer network NET1. Therefore, if the destination terminal T2 is out of connection with the computer network NET1, it cannot be accessed to by using an IP address. Thus, the data base DB1 is used.

Figure 5:
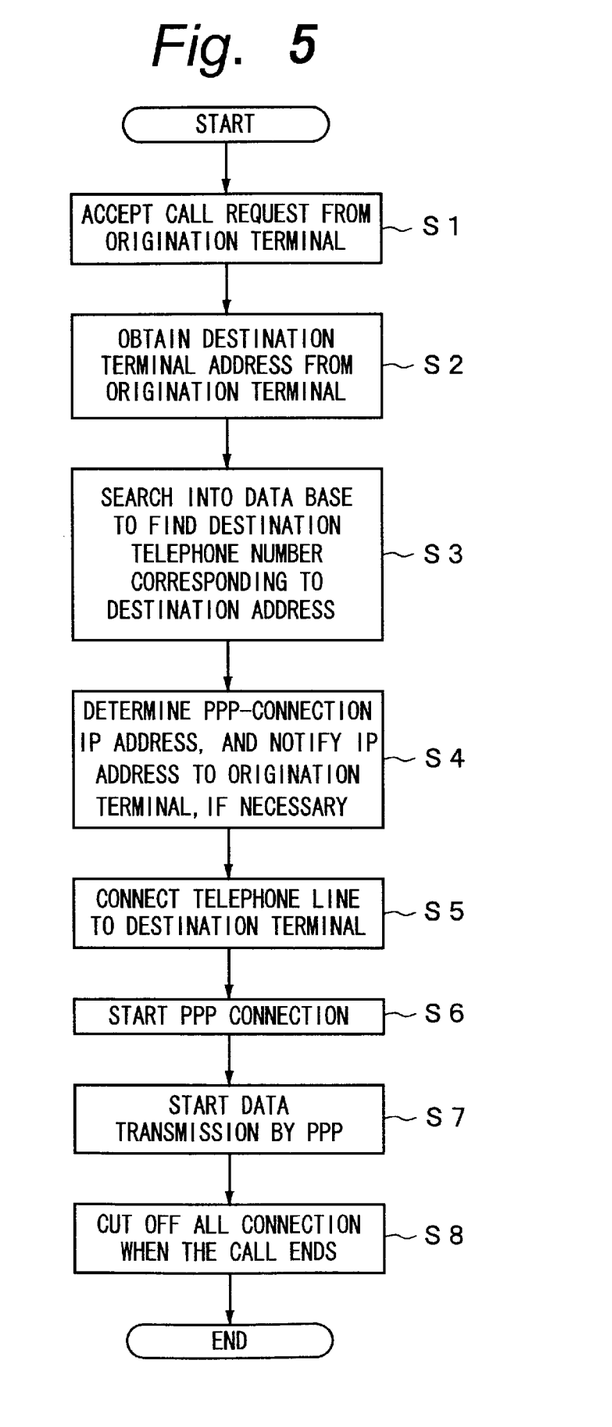
FIG. 5 is a flow chart for use in explaining an internet telephone system to which the invention is applied.

FIG. 5 is a flow chart showing the accessing process using the data base DB1. First, the source terminal T1 dials the computer network NET1 of the internet service provider to call up the server S1 of the computer network NET1. In response, the server S1 requests the terminal T1 to enter its account code and password in order to confirm whether the source terminal T1 is one of contractors of the internet service provider. The user of the source terminal T1 answers the request by entering its account code and password. When the server S1 confirms that the entered account code and password are those of a contractor, it assigns a temporary IP address to the terminal T1. Thus, PPP connection with the terminal T1 is started (step ST1).

After that, the terminal T1 designates a desired destination address (for example, terminal T2) (step ST2).

In response, the server S1 searches into the data base DB1 to find out information on the terminal T2 corresponding to the requested destination address. The telephone number of the terminal T2 for PPP connection can be known from information in the data base DB1 (step ST3).

The server S1 subsequently determines an IP address for specifying the destination terminal T2 within the server to prepare for PPP connection, and gives a notice on the destination terminal's IP address to the source terminal T1 (step ST4).

Then, the server S1 dials the telephone number of the terminal T2 found out from the data base DB1 to call up the terminal T2. When connection of the telephone line to the destination terminal T2 is acknowledged, the server S1 gives approval and assigns the IP address to the destination terminal (step ST5).

PPP connection is thus started (step ST6). As a result, audio data is exchanged for communication between the terminals T1 and T2 (step ST7). The audio data is transmitted in a compressed form. For exchanging audio data, UDP is used as the protocol of the transport layer.

When the communication ends, all connections including PPP connection and telephone line connection between the terminal T1 and the server S1 and those between the terminal T2 and the server S1 are disconnected (step ST8).

Although the above example is configured to determine the IP address of the terminal T2 prior to completing access to the terminal T2, the IP address of the terminal T2 may be determined after the access to the terminal T2 is completed. It is also possible to inform the source terminal T1 of the assigned IP address, if necessary. When the source terminal is informed of the IP address at the time when the server determines the IP address of the destination terminal, the source terminal can prepare for communication with the destination terminal such that the terminals can smoothly proceed to communication.

In this manner, the data base DB1 is provided which stores information on telephone numbers for PPP connection, and a destination terminal is accessed to through the telephone number obtained from the data base DB1 when the destination terminal is a PPP-connected terminal (T2, for example). Then, the destination terminal T2 is connected to the server S1 by PPP. Therefore, even when the destination terminal is a PPP-connected terminal, the destination terminal can be called up for communication.

By calling up the server S1 from the source terminal T1 and establishing PPP connection between the source terminal T1 and the server S1 and by calling up the destination terminal T2 from the server S1 and establishing PPP connection between the destination terminal T2 and the server S1, the terminals T1 and T2 can be set for communication. However, it may take several minutes to complete the connection because of the time for confirmation of contracts or other processes. Thus, the user is kept waiting on the line for a relatively long time until his terminal is actually connected to the destination terminal.

A solution is to first connect the source terminal T1 and the server S1 at the start of the communication, then disconnect the terminal T1 from the server S1 after informing the terminal T1 of the IP address to put the terminal off the line until the process for connecting the terminal T1 to the destination terminal T2 is completed. In this case, it is possible to reserve the IP address to be assigned to the source terminal T1 such that the server S1 calls up the source terminal T1 and reconnects to the terminal T1 with the reserved IP address when the process for connection between the server S1 and the destination terminal T2 progresses to PPP connection. In this manner, it is avoided that the source terminal wastes time for connection for actual communication.

In addition to the above-explained function, if the destination does not respond, the server may inform the source terminal of the status. This function increases the convenience of the system by preventing the user from waiting on the line for a long time without being connected.

It is also possible to hold PPP connection between the source terminal and the server until connection to the destination terminal is established and to permit the user of the source terminal to wait while doing his work before the connection is completed. This is especially effective when the terminal is a multi-task personal computer or work station. This function may be made more convenient by ringing bells or giving a visual display indicating completion of connection to the destination terminal when the connection to the destination terminal is established.

How to designate the destination terminal is an important factor in these internet telephones. In case of ordinary telephones, a telephone number combining only numerals is used to specify a destination terminal. However, a row of numerals is difficult to remember. In the internet, data is sent by designating an IP address combining four units of three-digit numerals. Also the IP address is inconvenient for ordinary users to use it to call up the destination terminal. Moreover, since IP addresses are not definitely assigned to terminals in PPP connection, destination terminals cannot be identified by IP addresses.

A solution of this problem is to use a mail address combining an account name and a domain name to call up a destination terminal through an internet telephone. A mail address has a form like "username@domain1.domain2..." "username" is the user's account name, "domain1.domain2...." is the domain name (organization name) to which the user belongs. A plurality of domain names can be joined by a ".", "@" is a letter that separates the account name and the domain name.

The mail address is easier to remember than the IP address. However, the mail address does not identify a terminal itself but identifies an individual. Therefore, the mail address is considered unsuitable for internet telephones used by calling terminals.

A solution of the problem is to assign an appropriate name to each terminal so that the terminal name is used to access from one terminal to another terminal. Each terminal name exclusively defines each terminal, and it is chosen so that a common name is used for different terminals in a common domain. Since terminal names can be registered in the server together with user's information such as designation telephone numbers, they can be used for connection of internet telephones. In this manner, even for PPP connection between the server and a destination terminal, connection can be established by using a terminal name alone independently of the IP address.

A domain name and a terminal name can be combined by "." into, for example, "machine.domain1.domain2...." as a general way of representation of a terminal name on the internet as explained above with reference to the mail address, and can be used also for identifying communication terminals of internet telephones. However, if such combination is used in this form to identify the internet terminal, it is not always easy to use due to limitation in the number of letters of the terminal name or for other reasons.

To deal with this matter, this example is designed to preferentially choose names as easy to remember as the names of internet telephone terminals without limiting the number of letters.

More specifically, as shown in FIG. 4, the invention uses a data base DB1. Lists of the data base DB1 contain "terminal name", "internet name", and others. The data base DB1 has another list of connection types that indicate PPP connection or LAN connection. If the connection type is PPP, there is an additional, list of telephone numbers for connection. Therefore by choosing a mode of representation easy to use by the user among "terminal names", "internet names", a desired destination terminal can be identified. For example, the destination terminal can be identified by "H_WATANABE", for example, which is similar to the user's actual name, as the name representing the internet terminal.

Although the lists of FIG. 4 contain information necessary for internet telephones alone, also other information including users' registration numbers, addresses and passwords requested for approval of connection to the server must be registered as lists of the data base. Additionally, it will be convenient for PPP connection to add a list of IP addresses assigned by the server.

Figure 6:
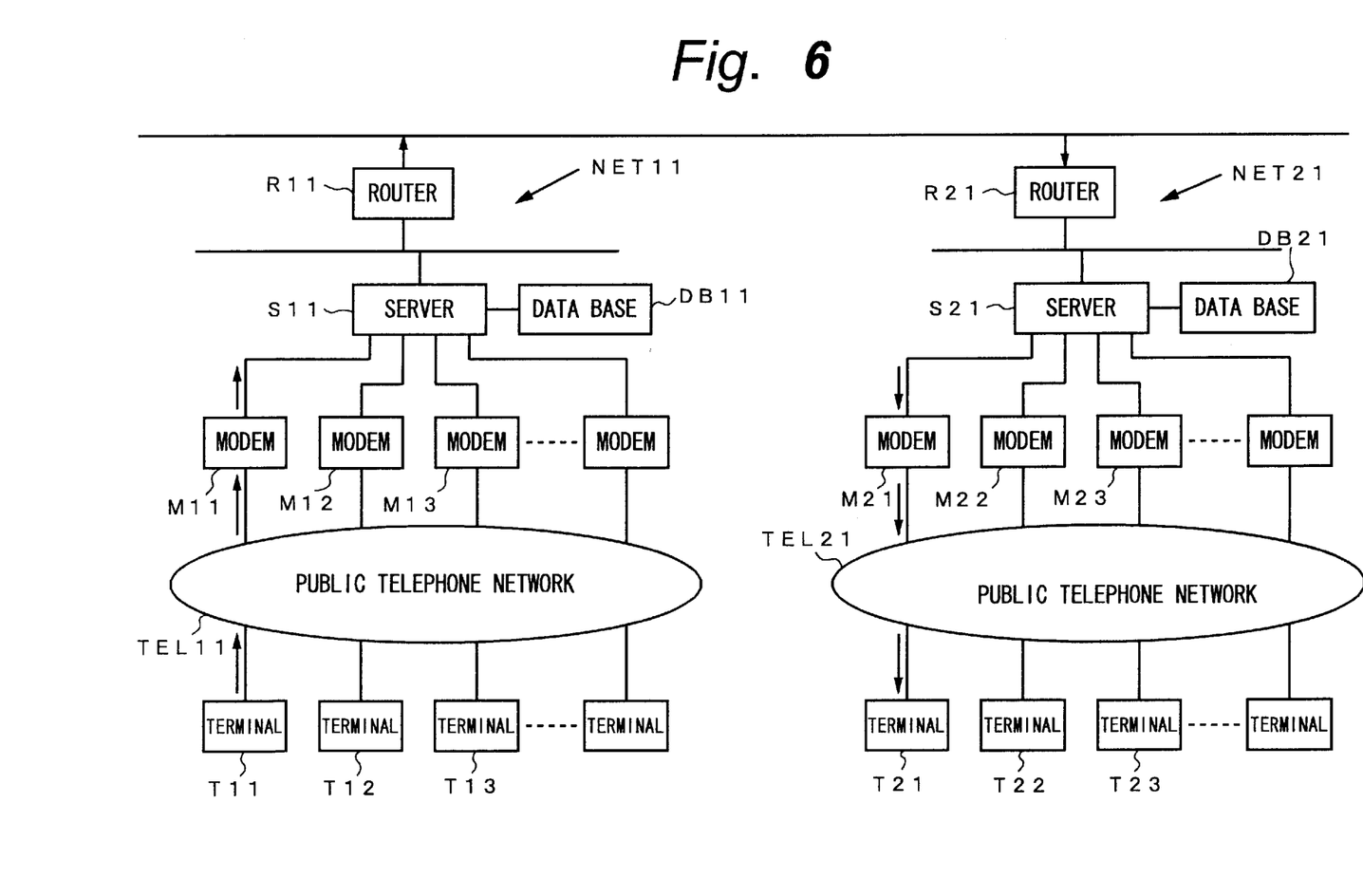
FIG. 6 is a block diagram for use in explaining another internet telephone system to which the invention is applied.

In the above example, a terminal is connected for communication with another terminal in a common computer network. However, a terminal in a computer network can be connected for communication also with a terminal in a different computer network. FIG. 6 shows an example where terminals in different computer networks are connected for communication.

In FIG. 6, a computer network NET11 is, for example, a computer network prepared by an internet service provider. The computer network NET11 contains a server S11 and a router R11. The server S11 is connected to a public telephone network TEL11 through modems M11, M12, M13, . . . . The server S11 has a data base DB11. The data base DB11 stores information containing telephone numbers of terminals connected by PPP to the computer network NET11. The computer network NET11 is connected to other computer networks forming the internet through the router R11. The router R11 routes data on the computer network to an appropriate computer network containing a destination terminal. Terminals T11, T12, T13 . . . are those of individuals personally participating the internet.

A computer network NET21 is, for example, a computer network prepared by another internet service provider. The computer network NET21 contains a server S21 and a router R21. The server S21 is connected to a public telephone network TEL21 through modems M21, M22, M23, . . . . The server S21 has a data base DB21. The data base DB21 stores information containing telephone numbers of terminals connected by PPP to the computer network NET21. The computer network NET21 is connected to other computer networks forming the internet through the router R21. The router R21 routes data on the computer network to an appropriate computer network containing a destination terminal. Terminals T21, T22, T23 . . . are those of individuals personally participating in the internet.

Figure 7:
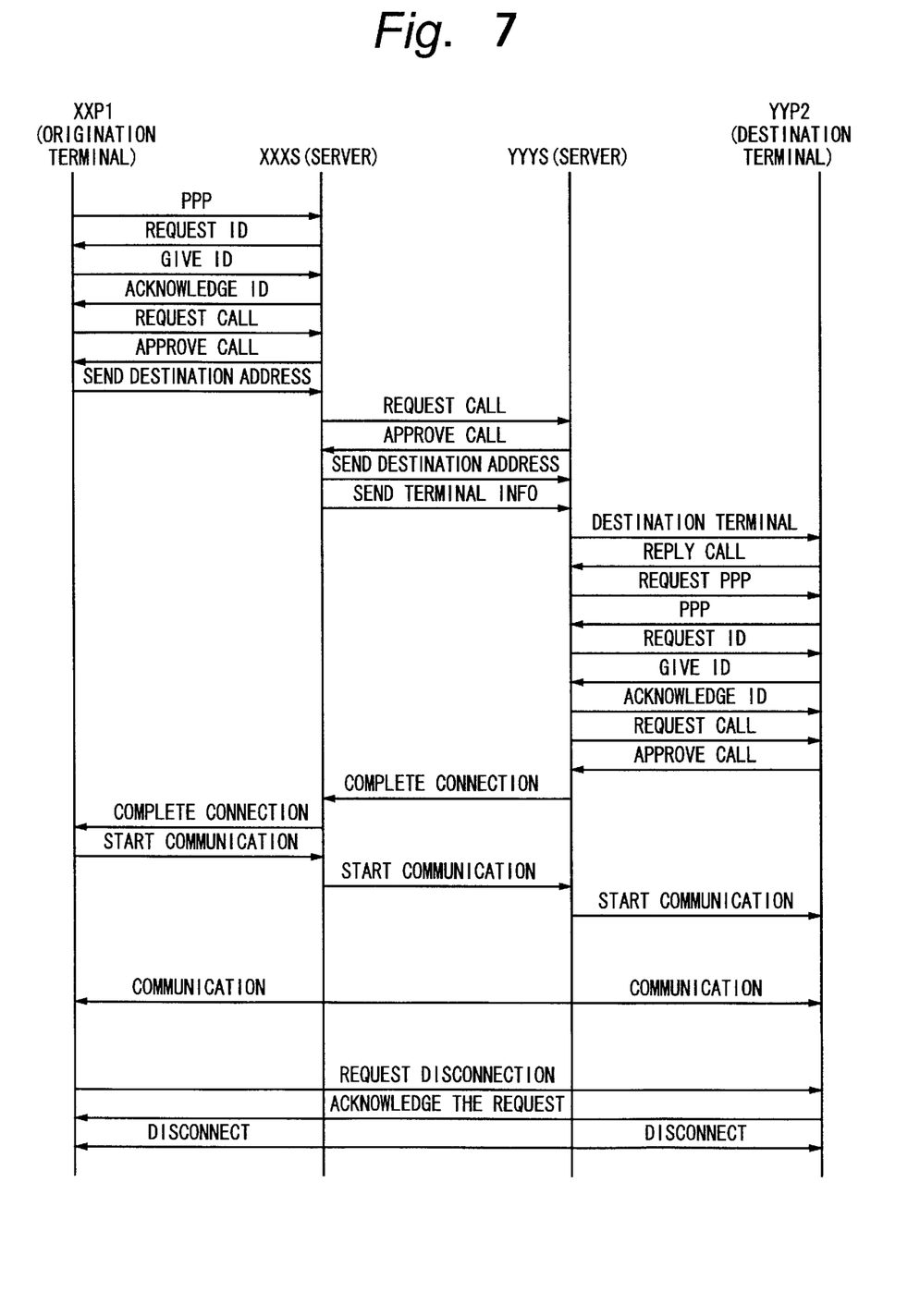
FIG. 7 is a sequence diagram for use in explaining another internet telephone system to which the invention is applied.

Assume here that the terminal T11 desires a telephone call to the terminal T21. In this case, a process is progressed as shown in FIG. 7.

First, the source terminal T11 dials the computer network NET11 of the internet service provider to call up the server S11 of the computer network NET11. Responsively, the server S11 requests the terminal T11 to enter its account code and the password in order to confirm whether the source terminal T11 is one of contractors of the internet service provider.

The user of the source terminal T11 answers the request by entering its account code and the password. When the server S11 confirms that the entered account code and password are those of a contractor, it assigns a temporary IP address to the terminal T11. Thus, PPP connection of the terminal T11 is started.

After that, the terminal T11 sends a call request to the server S11, and the server S11 sends back a call approval. In receipt of the call approval, the terminal T11 gives a desired destination address (terminal T21, for example).

The server S11 connected to the source terminal in receipt of the destination address sends a call request for communication with the terminal T21, for example, to the server S21 of the computer network (NET21, for example) containing the destination terminal. In receipt of the call request for communication with the terminal 21, the server S21 sends back a call approval to the server S11. In receipt of the call approval, the server S11 of the network NET11 containing the source terminal sends the destination address and information on the source terminal.

The server S21 of the computer network NET21 containing the destination terminal searches into the data base DB21 to find out information on the terminal T21. The telephone number of the terminal T21 for PPP connection can be known from information of the data base DB21. The server S21 of the computer network NET21 dials the telephone number of the terminal T21 obtained from the data base DB21 to call up the terminal T21.

The destination terminal T21 accessed by the server S21 sends back an acknowledgement. The server S21 in receipt of the acknowledgement requests PPP connection, and the terminal T21 in receipt of the request for PPP connection gives confirmation of PPP connection.

The server S21 then request entry of the account code and the password to give an approval. In response to the request, the user of the destination terminal enters the account code and the password. When the entered account code and password are confirmed to be those of a proper contractor, an IP address is assigned to the terminal T21. Thus, PPP connection of the terminal T21 is started.

When the PPP connection is started, a call request is sent from the server S21 to the terminal T21, and a call approval is sent back from the terminal T21 to the server S21. Then, the server S21 of the computer network NET21 sends a call connection completion notice to the server S11 of the computer network NET11, and the server S11 sends a call connection completion notice to the terminal T11. As a result, audio data is exchanged for communication between the terminals T11 and T21.

When a disconnection request is issued from the source terminal T11, for example, after the communication ends, the disconnection request is sent to the destination terminal T21. In receipt of the disconnection request, the terminal T21 sends back a disconnection agreement to the terminal T11, and all connections are disconnected.

In the above example, the servers S11 and S12 of the computer networks NET11 and NET12 contain their own data bases DB11 and DB12, respectively. However, the internet may use a common server that gives information on telephone numbers of respective terminals and others.

In the system where communication is possible between terminals of different computer networks, how to designate a server is an important problem. Considering that the internet can distinguish individual networks by domain names, the same may be applied to the servers for communication, namely, a domain name can be assigned to each server.

Since a destination terminal can be considered to belong to a LAN of the domain where the server exists, the terminal of the user PPP-connected to the server may be considered to belong to the domain, and each terminal can be identified by the combination of "domain name plus terminal name".

Using the same mode of representation of a terminal containing a domain name on the internet also for PPP connection, the way of identifying a destination terminal, such as "machine.domain1.domain2. . . . ", can be used for communication. When a source terminal designates a destination terminal in this manner, the server refers to the domain name to find out the IP address of the server to which the destination terminal is to be connected, and accesses to the server having the IP address to exchange information necessary for communication processing. After that, the destination server effects processing for connection to the destination terminal. However, the domain name is not easy to use or remember as explained above.

Thus, also for domain names, a representation that is easy to remember and not limited in the number of letters can be employed as used for determining terminal names. For example, to access a terminal named "hnabe (internet short name of the terminal of Mr. or Ms. H.WATANABE) of Shinagawa, Tokyo, the representation of its terminal name and its regional name such as "H_Watanabe.Shi.Tokyo" may be approved as its communication domain name. At the same time, a list may be prepared for conversion between formal domain names and communication domain names such that a communication domain name entered on the internet is converted into its formal representation. In this manner, a destination terminal can be identified by its "terminal name plus regional name" which is easy to use or remember.

The internet telephone system to which the invention is applied as explained above may use exclusive internet telephone apparatuses as its terminals.

Figure 8:
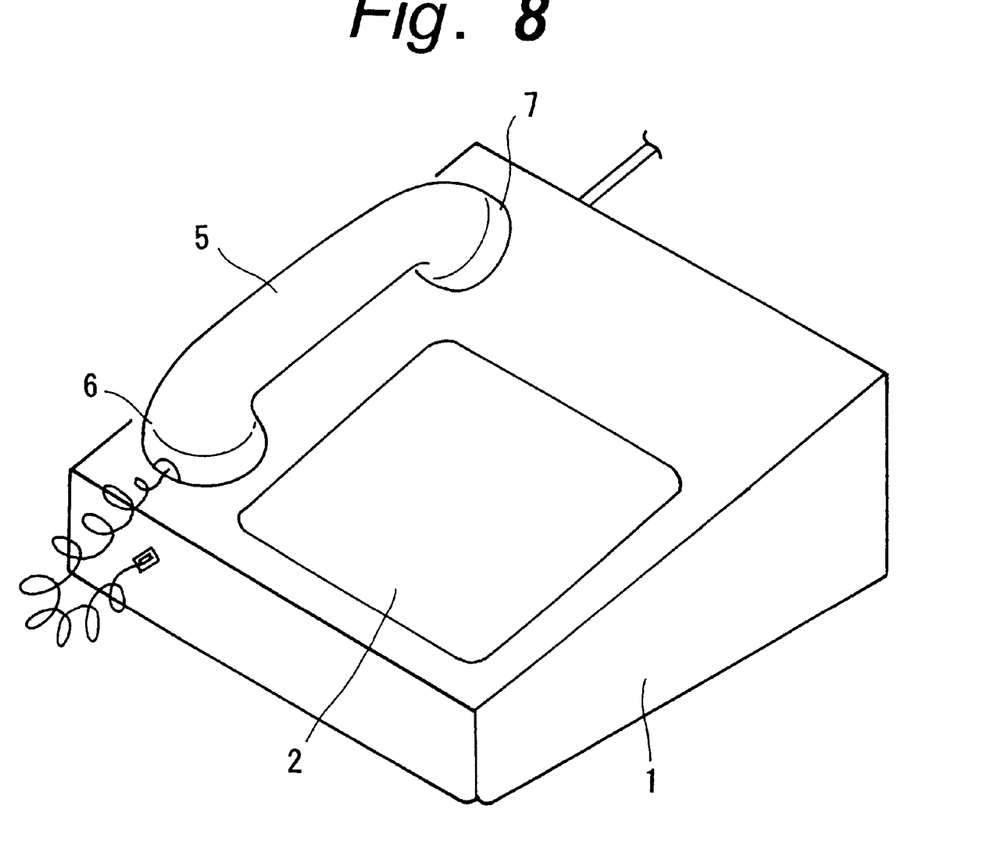
FIG. 8 is a perspective view of a telephone apparatus used in an internet telephone system to which the invention is applied.
Figure 9:
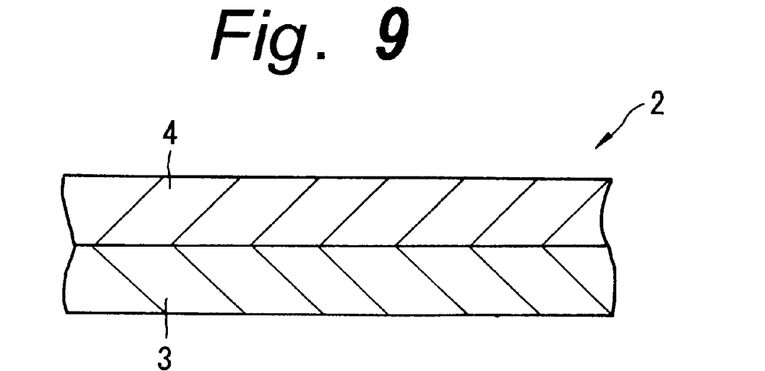
FIG. 9 is a cross-sectional view for use in explaining a telephone apparatus used in an internet telephone system to which the invention is applied.

FIG. 8 shows an internet telephone apparatus. In FIG. 8, numeral 1 denotes the main telephone body. The main telephone body 1 has a display/operator 2 on its upper surface. The display/operator 2 is a multi-layered panel including a touch panel 4 stacked on a display panel 3 as shown in FIG. 9. The display/operator 2 displays icons of numerical keys, operational keys, and so forth, which permit a user to enter a desired instruction by pressing the touch panel 4 at the portion of a corresponding icon. The display/operator 2 also displays a help message explaining how to operate the keys and the current status of the telephone apparatus in addition to key icons, etc. Other various information is also displayed on the display/operator 2. A handset 5 having a microphone 6 and speaker 7 is connected to the main telephone body 1. The main telephone body 1 is connected to a public telephone line.

Figure 10:
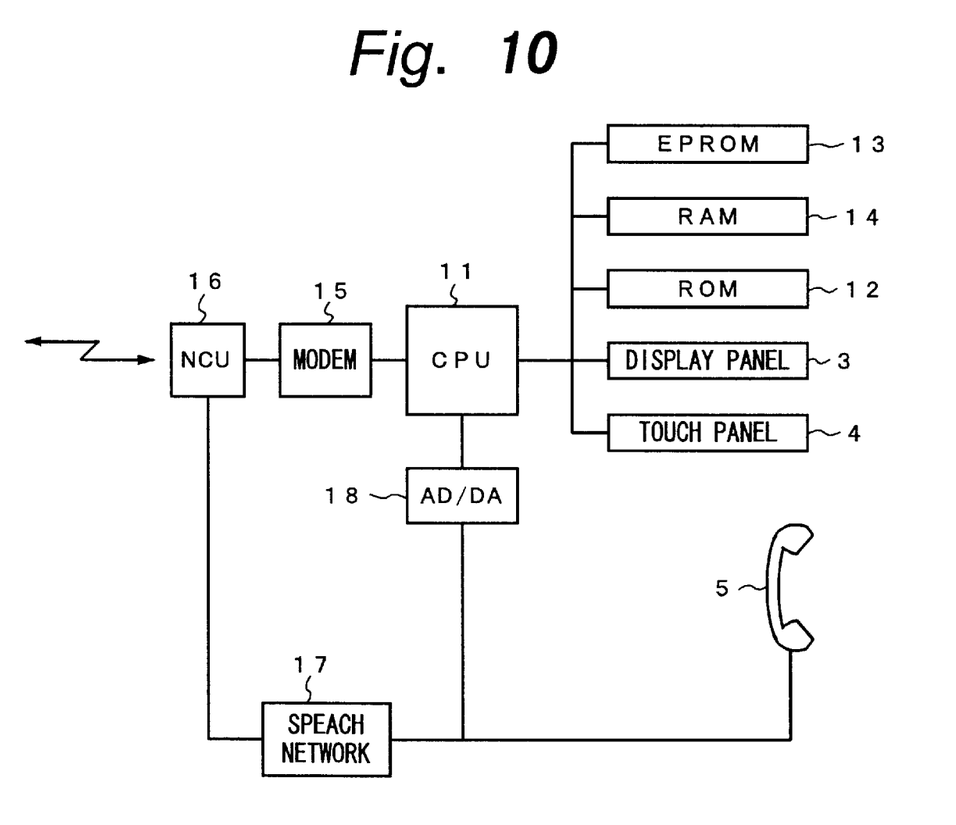
FIG. 10 is a block diagram of a telephone apparatus used in an internet telephone system to which the invention is applied.

FIG. 10 shows the interior construction of the internet telephone apparatus. In FIG. 10, numeral 11 denotes a CPU. Connected to the CPU 11 are ROM 12, EPROM 13 and RAM 11. Inputs from the touch panel 4 are given to the CPU 11, and outputs from the CPU 11 are displayed on the display panel 3.

CPU 11 performs dial connection processing, data transfer processing by IP, and audio signal compression/expansion processing. That is, when CPU 11 receives a destination address and other materials entered through the touch panel 4, it controls NCU (Node Control Unit) 14 to dial the telephone number of the server of the internet service provider to perform the telephone connection processing. When the telephone connection is completed, it proceeds to PPP connection processing. In some cases, a call may arrive from the server of the internet service provider, and PPP connection is requested. Also in such cases, CPU 11 performs telephone connection processing and, after completion of telephone connection, connection processing by PPP. During communication, CPU 11 executes compression or expansion of transmitted or received audio signals, and executes transmission processing by IP.

The audio signal through the microphone of the handset 5 is converted into a digital form by an A/D and D/A converter 18. The digital audio signal is sent to CPU 11 for compression processing there. The compressed audio signal is supplied to NCU 16 through a modem 15.

The compressed audio signal sent through the telephone line is delivered to CPU 11 via NCU 16 and modem 15. CPU 11 expands the audio signal. The expanded digital audio signal is sent to the A/D and D/A converter 18 and converted into an analog form. The analog signal is supplied to the speaker of the handset 5.

The internet telephone apparatus can be used as an ordinary telephone apparatus. When it functions as an ordinary telephone apparatus, the handset 5 and NCU 14 are connected through a speech network 17 to enable communication by analog audio signals through the telephone line.

For using an internet telephone by PPP connection, a personal computer is prepared in most cases. Such a personal computer needs connection of a microphone and a speaker and needs installation of appropriate software for connection to the internet. It is difficult for users unfamiliar with computers to set a personal computer ready for connection to the internet. Moreover, a computer connected by PPP for use as an internet telephone is difficult to operate and is expensive.

The internet telephone apparatus described above does not need installation of software for connection to the internet, and can be easily connected to the internet for audio communication. Moreover, the internet telephone apparatus is equipped with the handset 5 like ordinary telephone apparatuses and can be operated in the same manner as ordinary telephone apparatuses. Therefore, even a user unfamiliar with computers can readily use the internet telephone. Especially, since the above-described internet telephone apparatus includes the display/operator 2 made by stacking the touch panel 4 on the display panel 3, its operability is good.

Examples have been described above as being connected by PPP. However, the invention is not limited to those connected by PPP, but it is applicable in the same manner also to those of SLIP or the like. For example, when Ethernet is directly connected to the internet, connection may be made by finding out the IP address of a destination terminal from the data base of the server.

According to the invention, since a data base is prepared to store information on destination terminals to be PPP-connected to each terminal, the telephone number of a destination terminal for PPP connection can be obtained from the data base. When a source terminal makes a call to a destination terminal to be connected by PPP, the server of the computer network searches into the data base to obtain the PPP connection address of the destination terminal. Then, the server accesses the PPP connection address to establish PPP connection with the destination terminal. In this manner, each terminal can access any destination terminal to be connected by PPP and can effect communication therewith.

What is claimed is:

1. A server for an internet network telephone system having a plurality of terminal devices, a telephone network, and an internet network for transmitting audio signals, wherein said internet network is connected to said plurality of terminal devices via said telephone network, said server comprising:

- a data base for storing a public phone number for point-to-point protocol and an internet protocol address concerning each of said plurality of terminal devices;
- a plurality of modems for respectively connecting said plurality of terminal devices to said server by way of said telephone network;
- means for obtaining a public phone number and an internet protocol address of a second terminal device stored in said data base;
- means for accessing said second terminal device by using said public phone number and said internet protocol address of said second terminal device when a first terminal device currently connected to said server makes a request to said server to be connected to said second terminal device currently disconnected from said internet network, thereby enabling communication between said first and second terminal devices over said internet network;
- means for disconnecting said first terminal device from said server after said first terminal device makes said request to said server;
- means for reconnecting said server to said first terminal device using an internet protocol address for said first terminal device when said second terminal device has been connected to said internet network and
- means for informing said first terminal device that said second terminal device did not respond when said second terminal device is unavailable.

2. The server according to claim 1, wherein said internet network includes a first server and a second server to which said first terminal device and said second terminal device are connected, respectively, and wherein said first and second terminal devices are connected through said first and second servers.

3. A method of communication between first and second terminal devices through a telephone network connected to a server of an internet network, said method comprising the steps of:

- storing in a data base of said server a public phone number for point-to-point protocol and an internet protocol address for a plurality of terminal devices;
- making a request from said first terminal device currently connected to said server for connection to said second terminal device currently disconnected from said internet network;
- disconnecting said first terminal device from said server after said first terminal device makes said request to said server;
- obtaining a public phone number and an internet protocol address for said second terminal device stored in said data base;
- accessing said second terminal device using said public phone number and said internet protocol address;
- reconnecting said server to said first terminal device using an internet protocol address for said first terminal device when said second terminal device has been connected to said internet network; and
- informing said first terminal device that said second terminal device did not respond when said second terminal device is unavailable.

4. A server according to claim 1, further comprising means for informing said first terminal device of a status of said request to be connected to said second terminal device.

5. A server according to claim 1, further comprising means for notifying said first terminal device when said second terminal device has been connected to said internet network.

* * * * *